US006937855B2

(12) United States Patent
Nadan

(10) Patent No.: US 6,937,855 B2
(45) Date of Patent: Aug. 30, 2005

(54) MOBILE TRACKING DEVICE FOR TRANSPORTATION INDUSTRY

(76) Inventor: Joseph S. Nadan, 710 Flintlock, Southport, CT (US) 06490

( * ) Notice: Subject to any disclaimer, the term of this patent is extended or adjusted under 35 U.S.C. 154(b) by 0 days.

(21) Appl. No.: 10/399,280

(22) PCT Filed: Nov. 9, 2001

(86) PCT No.: PCT/US01/43028

§ 371 (c)(1),
(2), (4) Date: Jan. 7, 2004

(87) PCT Pub. No.: WO02/39643

PCT Pub. Date: May 16, 2002

(65) Prior Publication Data

US 2004/0116116 A1 Jun. 17, 2004

Related U.S. Application Data

(60) Provisional application No. 60/248,051, filed on Nov. 13, 2000, and provisional application No. 60/225,755, filed on Dec. 14, 2000.

(51) Int. Cl.[7] .......... H04M 3/00

(52) U.S. Cl. .......... 455/418; 455/432.1; 455/455

(58) Field of Search .......... 455/418, 456.1, 455/67.11, 432.1, 437, 455, 457; 340/988, 989, 990; 701/207, 208; 342/357.01, 357.02

(56) References Cited

U.S. PATENT DOCUMENTS

| | | | | |
|---|---|---|---|---|
| 5,299,132 A | | 3/1994 | Wortham | |
| 5,666,647 A | | 9/1997 | Maine | |
| 6,212,268 B1 | | 4/2001 | Nielsen | |
| 6,331,835 B1 | * | 12/2001 | Gustafson et al. | 342/357.06 |
| 6,339,745 B1 | | 1/2002 | Novik | |

* cited by examiner

*Primary Examiner*—Melur Ramakrishnaiah
(74) *Attorney, Agent, or Firm*—Dickstein Shapiro Morin & Oshinsky LLP

(57) ABSTRACT

A freight tracking system having sufficient accuracy for most commercial freight hauling purposes is disclosed. The system includes a mobile telephone transmitter located in the freight or in the vehicle hauling the freight that automatically calls a telephone at the central reporting station. A caller reception unit detects the calling number and current visited base station information without answering the call and supplies it to a computer at the central reporting station which then determines the location of the shipment.

19 Claims, 7 Drawing Sheets

120

MOBILE TRACKING DEVICE FOR TRANSPORTATION INDUSTRY

CROSS-REFERENCE TO RELATED APPLICATIONS

This application claims priority to provisional application No. 60/248,051 filed Nov. 13, 2000 and incorporates the contents of that application by reference. Additionally, this application contains subject matter related to co-pending application Ser. No. 60/225,755 filed Dec. 14, 2000, the contents of which are also hereby incorporated by reference.

FIELD OF THE INVENTION

This invention relates to a freight management system for tracking the location of freight as it moves from its point of origin to its destination.

BACKGROUND OF THE INVENTION

Commercially available freight tracking systems are based on a combination of a Global Positioning System (GPS) radio receiver and an in-vehicle back-link device for transmitting information to a central reporting station. The in-vehicle back-link device for transmitting information is most usually a mobile telephone and is sometimes a radio transmitter. The GPS receiver determines the precise location of the vehicle from transmissions received from overhead GPS satellites and the back-link device communicates this location back to a central reporting station. This GPS and back-link system provides precise information on the location of the vehicle, but unfortunately is relatively expensive to implement. It would be desirable, therefor, to have a freight tracking system that is less costly.

When a mobile telephone is outside its "home" subscription area it is said to be "roaming". When roaming, a mobile telephone continually listens for a new "beacon signal" from a nearby base station or tower. Upon reception of a new beacon signal, the mobile telephone will identify itself and request registration on the "visited location" system to be able to receive and send calls. When the visited location system receives the identification information it sends an "authentication request" to the requesting mobile telephone's home system, which sends an appropriate "authentication response" to the visited location system. The visited location system then approves or disapproves user access and sends "notification of authentication or rejection" to the mobile telephone. An approved mobile telephone is then able to receive and send calls in the visited location; the home system will subsequently receive all necessary information for all calls such that it will be able to bill for "roaming", long distance and other provided services. A rejected mobile telephone does not have access to service in the visited location. For more detail on roaming and beacon signals see "Beacon Signals: What, Why, How, and Where", by S. Gerasenko, et.al., *IEEE Computer*, Volume 34, Number 10, October 2001, pp.108–110.

SUMMARY OF THE INVENTION

In view of the above-noted problems of cost-effective freight tracking, the present invention provides a tracking apparatus having a callback unit programmed to telephone a specific destination and then terminate the telephone calls prior to their completion and attachment to a mobile device. The present system includes a computer system responsive to the unanswered calls from the callback unit, the computer system having call-information processing software, a database, and a user interface resident. The unanswered-call information can be proprietary to a specific telephone provider, or can be customized to a stand-alone phone company integrated with the computer system. The calls can be received by either a landline telephone system connected to the computer system, or by a mobile telephone system which transfers calls to a landline system also connected to the computer.

An additional embodiment of the present invention encompasses a method for tracking, including the steps of calling a central base station from a callback unit attached to a mobile device, programming the duration of the telephone call to be sufficient to convey call-origin properties yet brief enough to hang up before incurring calling charges, reading call-origin information accompanying the call, processing desired portions of the call-origin information by a computer system connected to the central base station; and coordinating the call-origin information with a database within the computer system.

BRIEF DESCRIPTION OF THE DRAWINGS

The foregoing and other features and advantages of the invention will become more apparent from the detailed description of the exemplary embodiments of the invention given below with reference to the accompanying drawings in which.

DETAILED DESCRIPTION OF THE INVENTION

The present invention can be used for locating any type of mobile device that can originate a telephone call. It provides a less costly way to determine the approximate location of the mobile device with sufficient accuracy for many purposes that do not require knowing its precise location. For illustrative purposes, the following embodiments will be implemented within the transportation industry. The present invention provides a less costly freight tracking system having sufficient accuracy for most commercial freight hauling purposes. However, this invention can be applied to any industry.

The system of the present invention includes a mobile telephone transmitter located in the freight or in the vehicle hauling the freight that periodically calls a telephone at a central reporting station. This telephone call is never answered, so that no calling charges are incurred. Instead, a caller reception unit detects the calling number and its current visited base station information without answering the call, and supplies that information to a computer located within the central reporting station. This computer accesses a database that contains visited base station location information for the region in which the freight hauling vehicle is traveling (for example, the continental United States as well as portions of Mexico and Canada) and uses it to determine the geographical location of the visited base station from which the call was originated. In this manner, the location of a freight unit is determined to within a few miles around the visited system base station without ever completing a call and without incurring the call charges associated with such a call.

In an alternate embodiment, the mobile telephone unit, rather than periodically sending the information, also contains a mobile receiver that receives (also without answering the call) an implied request to callback the central reporting station. The call is then placed by the mobile transmitter and processed in the same manner as described above.

Figure 1:
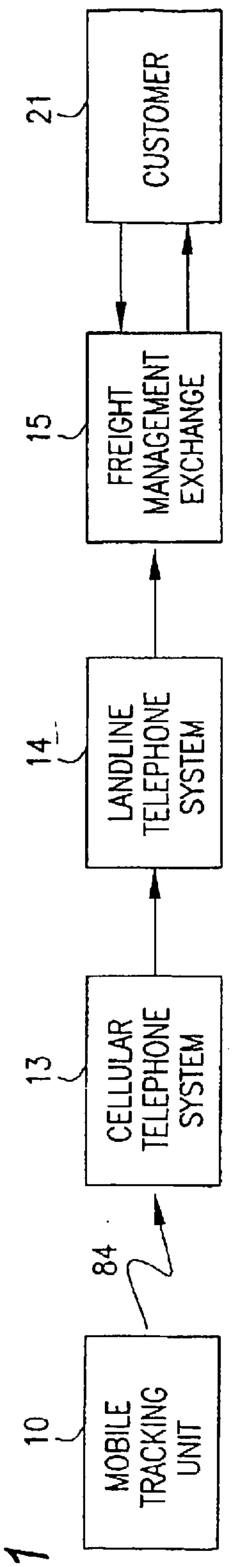
FIG. 1 is a block diagram of a freight tracking system constructed in accordance with a representative embodiment of the present invention.
Figure 2:
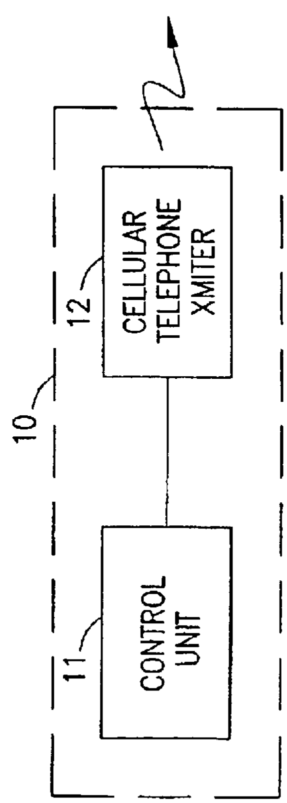
FIG. 2 shows in greater detail the construction of the mobile tracking unit of FIG. 1.

Referring to FIG. 1, a small, inexpensive mobile tracking unit 10 is located in the vehicle hauling the freight or in the freight itself. As shown in FIG. 2, mobile tracking unit 10 includes a control unit 11 that controls a mobile cellular telephone transmitter 12. Control unit 11 is programmed to cause the mobile telephone transmitter 12 to periodically call a telephone located at a central reporting station 50 that is part of the freight management exchange 15.

The mobile cellular telephone transmitter 12 may be caused to call the central reporting station 50 periodically; e.g. once an hour. The mobile phone call 84 transmitted by the mobile tracking unit 10 can be received by a cellular telephone system 13 that can, in turn, transfer it to a landline telephone system 14.

Figure 3:
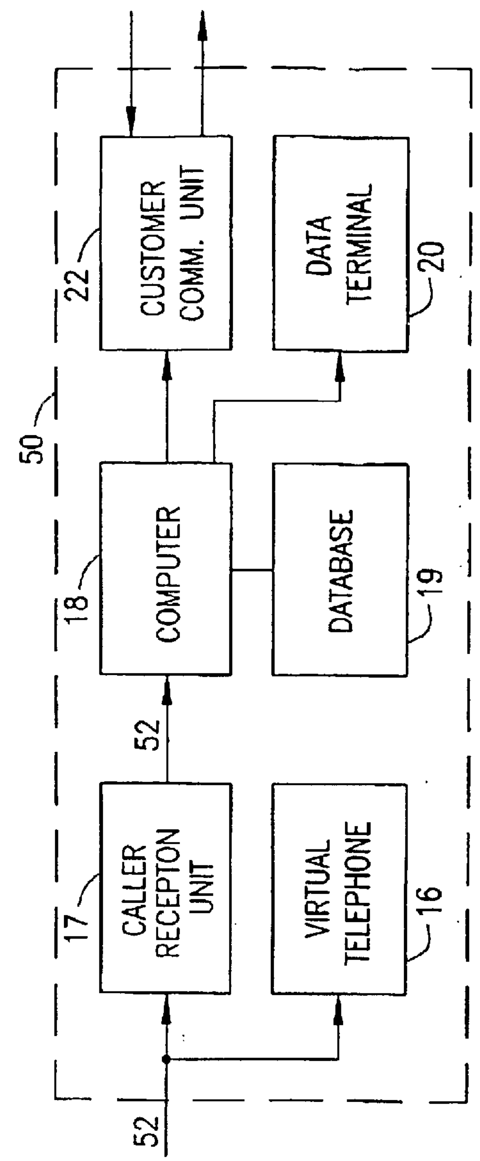
FIG. 3 shows in greater detail some of the equipment located in the freight management exchange of FIG. 1.

In either case, the landline telephone system 14 routes the call to one of several central reporting stations 50 (FIG. 3) which are part of the freight management exchange 15. Typical equipment located at a central reporting station 50 is shown in FIG. 3. The equipment includes a virtual telephone 16 that represents the telephone number to which the telephone call from the mobile tracking unit 10 is placed. However, the call is never answered. Despite the lack of an answer, the accompanying mobile caller identification information 52 (FIG. 4) is still detected by a caller reception unit 17 and supplied to a computer 18 which stores this information along with the date and time of its arrival. The mobile tracking unit 10 and the caller reception unit 17 are programmed to disconnect the call after a selected number of rings. Information contained within the call can be made available to customers 21 (FIG. 1) through communication units 22.

Figure 5:
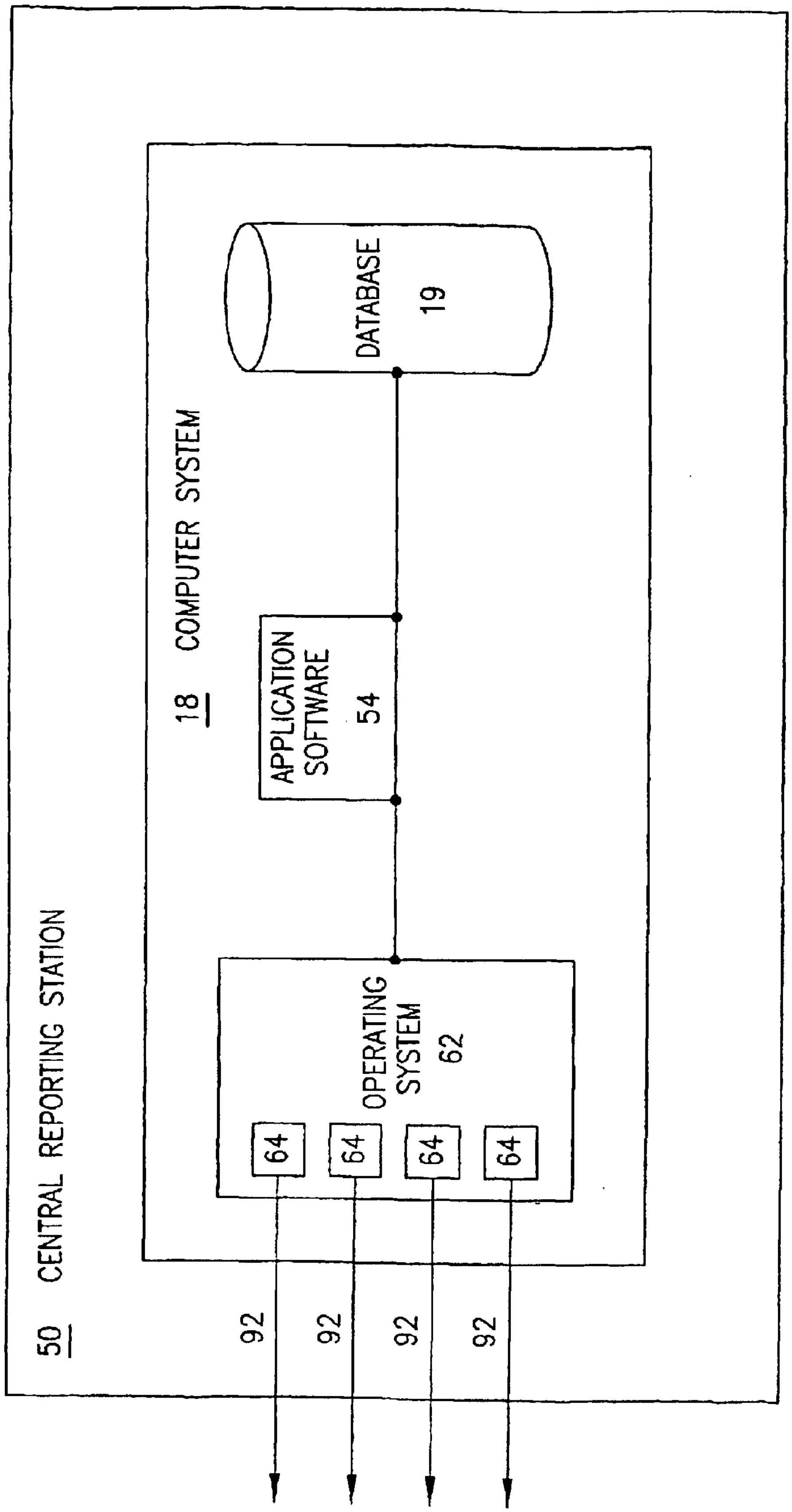
FIG. 5 shows application software integrated within a computer system.

The mobile caller identification information 52 received and stored by computer 18 includes the calling telephone number, which is used to identify the particular mobile tracking unit 10 that made the call as well as additional information about its approximate present location. For example, this additional information might be the visited location tower identification code or the telephone area code and exchange of the visited location telephone tower 80 which first received the call from the mobile unit 10. This visited location tower identification code or area code and exchange code information is automatically included as part of the mobile caller identification information 52 stored by the computer 18. Other encoded information may also be included. In a preferred embodiment, this information as well as a date and timestamp is packaged within the well-known SS7 telephone transmission protocol, although other protocols could also be used. As shown in FIG. 5, application software 54 resident on computer 18 detects which protocol is used, and queues and formats the information for subsequent processing by database application 19.

In a preferred embodiment, database 19 contains the geographical location of each cellular telephone tower identification code and telephone area code and exchange located in each area of the entire United States (and Canada and Mexico, if desired). In other words, database 19 contains a listing of the geographical locations of all the different unique towers and area code/exchange code combinations for the geographical region of interest (e.g., the entire United States). Computer system 18 contains a link to a telephone provider that allows for frequent periodic updating of cellular tower identification codes and area codes and exchanges and the geographic regions with which they correspond. When computer system 18 receives a packet of mobile caller information, it queries the database 19 to determine the geographical location from which the call was made. The geographical location, received mobile caller information, and date and timestamp are stored by computer system 18 and is processed by software application 54.

The method by which software application 54 strips off and formats the call data from cellular telephone system 13 can vary, and as stated depends in part on the protocol used. As stated earlier, calling charges are avoided by not answering the telephone call. However, other types of charges are still incurred. Even though the call was not answered, telephone companies may still charge for the use of a telephone number, or their cell tower or area code and exchange information. Numerous arrangements exist in which telephone companies may be compensated for the use of their information.

Figure 4:
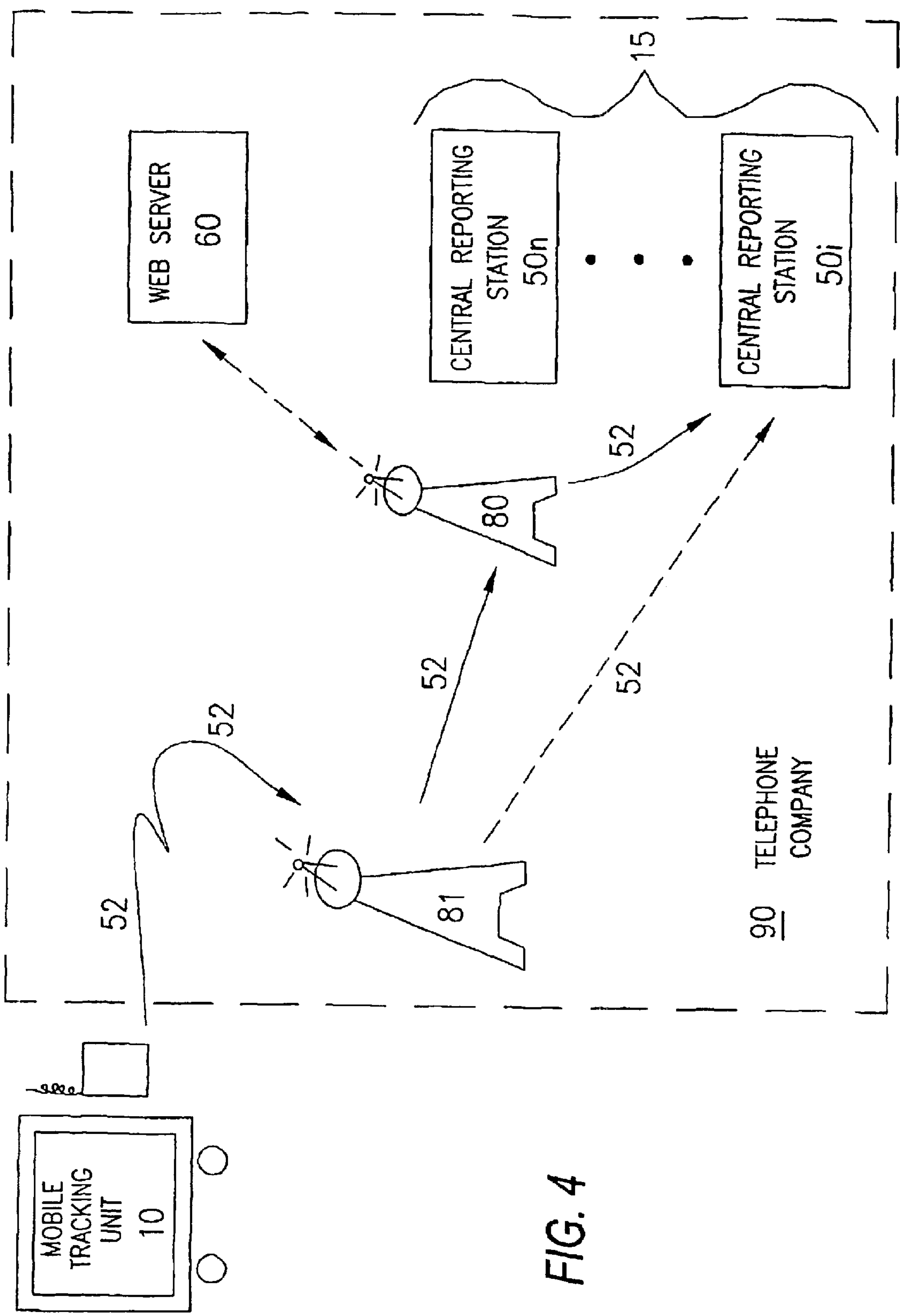
FIG. 4 shows an independent telephone company implemented within the present invention.

An alternative method for obtaining call information is to form a new or independent telephone company 90, as shown in FIG. 4. This has the advantage that no fees or charges are incurred per call. Instead, access rights to wireless transmitters 94 and in some cases an initial cell tower 81, forwarding cell tower 80, or a combination of the two are purchased or leased at bulls rates. This approach also results in additional advantages in maintaining the company's computer system and web server 60.

The system described above can be implemented through a variety of computer network topologies and implementations, including WANs, DSL, Voice over IP (VoIP), or any combination of these. Accordingly, mobile caller identification information 52 is shown as arriving at central Reporting Station $\mathbf{50}_1$, but can actually be directed to any of the Central Reporting Stations $\mathbf{50}_{1\text{-}n}$. In a preferred embodiment, a customer is assigned a specific user ID and password. As shown in FIG. 5, application software 54 works with database 19 to manage these user IDs and passwords so that customers 21 are granted access only to specific data areas of computer system 18. The data segmentation is managed by application 54 with the cooperation of database 19, so that the customers 21 are prevented from accessing information belonging to other customers. Using their user ID and password, a customer 21 can log onto the tracking company's Internet website 60 and determine the geographic location of one or more of their specific shipments.

A customer 21 lacking access to the computer network of the present invention who wants information on the current location of a particular freight shipment can also call the freight management exchange 15, which then provides the desired information by voice through a communication unit 22 as shown in FIG. 1. This is accomplished through a data terminal 20 coupled to the computer 18 for viewing or printing reports or providing audio of the time and location data for the different freight shipments being tracked by the system. If desired, this process may be automated so that location reports are automatically and periodically sent, either by e-mail, telephone, fax, or other suitable means of communication, to the customer 21. Alternatively, customer relationship management software using touch tone menus and a voice recognition unit (VRU) may be used to allow callers to query the time and location data without the intervention of a human operator.

A freight tracking system in accordance with the present invention can simultaneously handle a relatively large number of different mobile tracking units. In a single-telephone environment with no "call waiting" feature, the different mobile units can be programmed to place their calls at different times. However, as shown in FIG. 5, additional telephone lines 92 arranged in one or more hunt groups can be provided at the central reporting station 50 and connected to computer system 18 for handling a greater number of incoming calls. These multiple telephone lines are managed by the computer system 18 which is in turn equipped with a multi-threaded operating system 62 which is capable of spawning a new process 64 each time a new line is added. Each process 64 manages the processing the proprietary telephone company data and matches that processed data with a specific shipment contained in database 19. In the embodiment where the central reporting stations 50 are merged into an independent telephone company, the proprietary telephone company data described above is no longer proprietary, but can be customized to conform with either the needs of customers 21, central reporting stations $\mathbf{50}_{1\text{-}n}$, or mobile unit 10.

Figure 6:
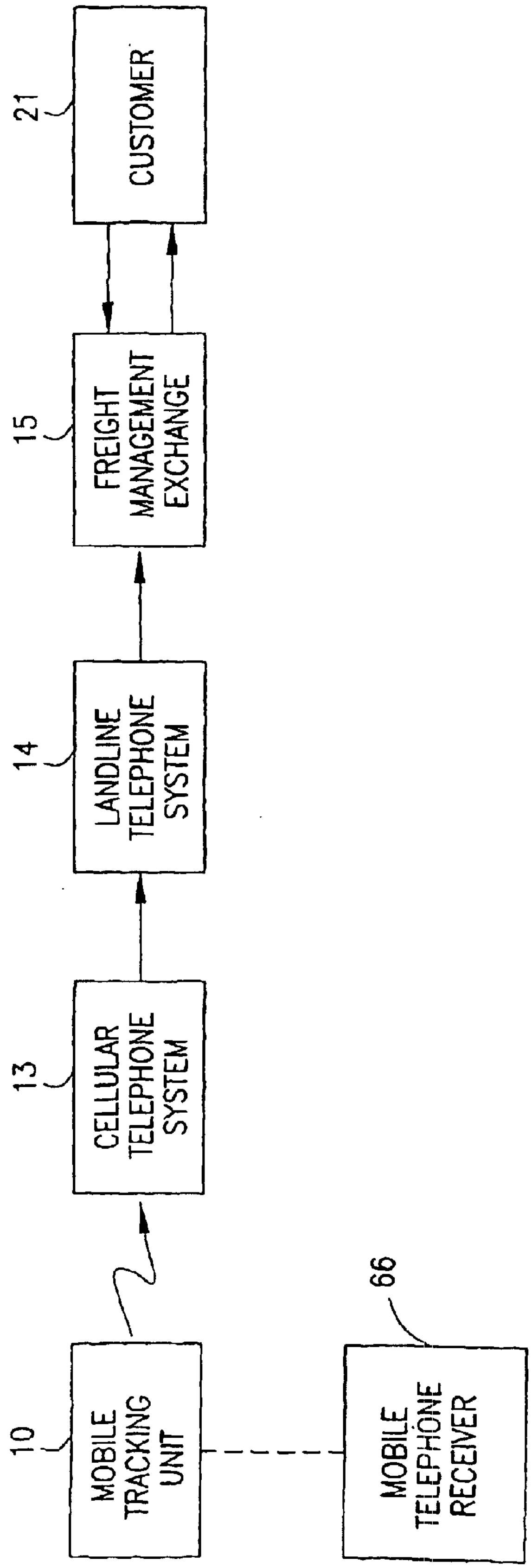
FIG. 6 shows a mobile telephone receiver incorporated within a tracking unit.

As a further modification, FIG. 6 illustrates how the mobile tracking unit 10 also includes a mobile telephone receiver 66 for receiving a telephone call from the freight management exchange 15. Again to avoid calling charges, this call is also not answered. Instead, the control unit 11 detects the occurrence of this call and the calling telephone number and instructs the mobile telephone transmitter 12 to, in response, place a call to the calling telephone number at the freight management exchange 15. This call is received and processed by the freight management exchange 15 in the manner previously discussed to provide the desired location information for the mobile tracking unit 10. This method of having the freight management exchange 15 triggers the call by the mobile unit 10 may be used either in addition to or in place of the above-described method of having the mobile unit 10 male self-initiated calls.

In a multiple telephone line environment, the application software 54 can manage not only the amount of incoming calls but also the frequency at which those calls occur. At a specified distance from its destination, mobile unit 10 may call the exchange 15 every three hours. However, as the distance falls below a specified limit, application software 54 can force mobile unit 10 to call the freight management exchange 15 once every hour.

Additionally, application software 54 can call all mobile units 10 which are expected at a specific destination within the next hour, or the next three or four hours. Software 54 accomplishes this by querying database 19 to determine the current location of all trucks going to the same destination and using an industry standard expected travel time database, e.g. PC Miler, to calculate the expected time of arrival. It should be noted that different types of vehicles will have different travel times from the same current location to the same destination. For example, a hazardous cargo transport may not be allowed to go through a tunnel increasing the travel time by perhaps one hour. The software 54 can then query which of the trucks from among this pool are expected within a specific time-range. The same query can be adjusted to search for shipments rather than trucks.

Figure 7:
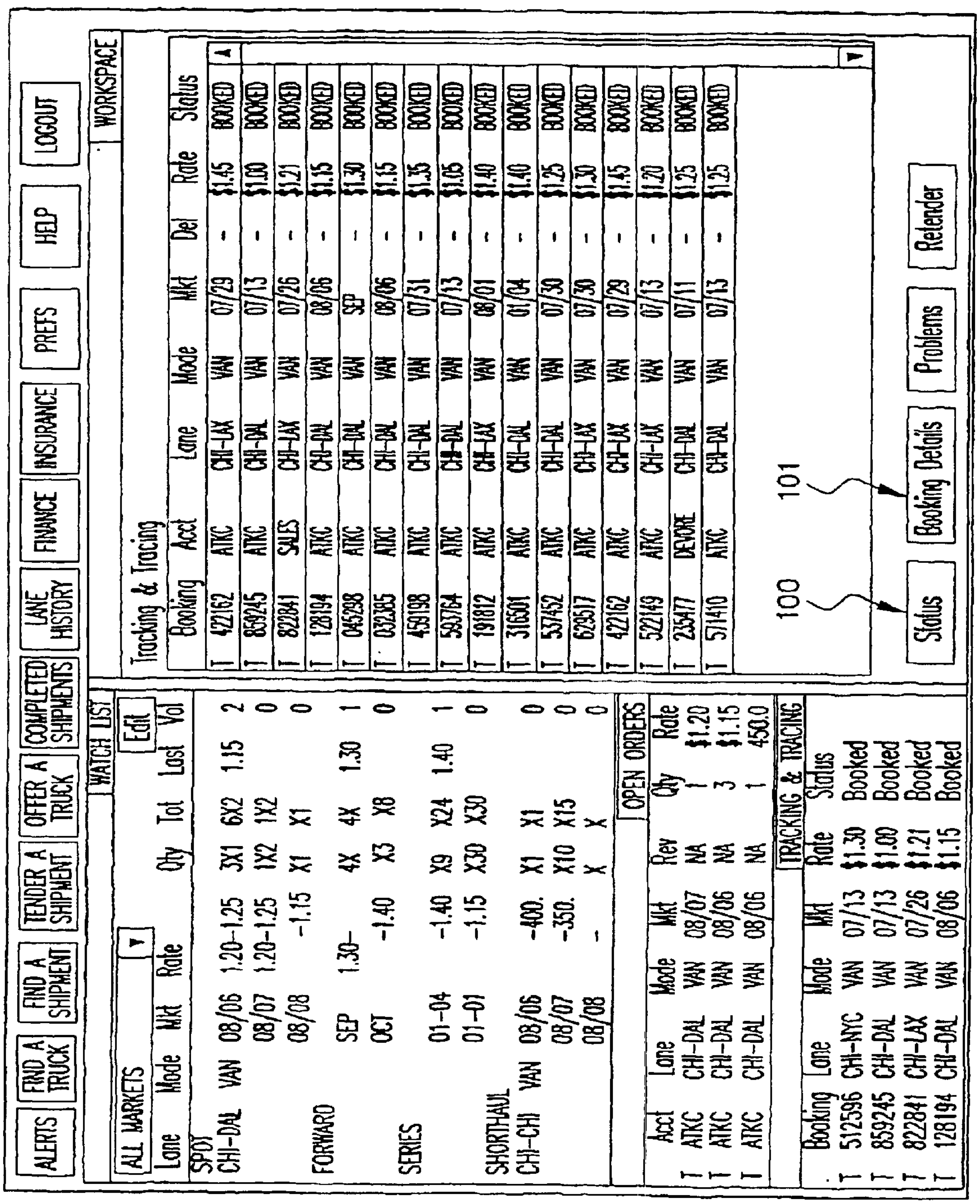
FIG. 7 shows the user interface for tracking and tracing a shipment.

As shown in FIG. 7, the software 54 has a user interface 70 being divided into several panels including WATCH LIST, OPEN ORDERS, TRACKING AND TRACING, and WORKSPACE. To access these panels customer 21 must successfully login by entering an authorized user ID and password. FIG. 7 shows a brief summary of currently active or incomplete bookings. The user clicks on the heading or a specific booking to display a complete list of incomplete bookings, and can then click on one or more column headings to sort the list by that column. Clicking anywhere in the TRACKING AND TRACING panel caused additional tracking and tracing information to be displayed in the WORKSPACE panel. Within this workspace panel, the first shipment in the list defaults to being highlighted, although the user can select and highlight any shipment in the list. Accordingly, the top shipment, with booking number 422162, is highlighted and will be used as an example for further explanation of the present invention.

Figure 8:
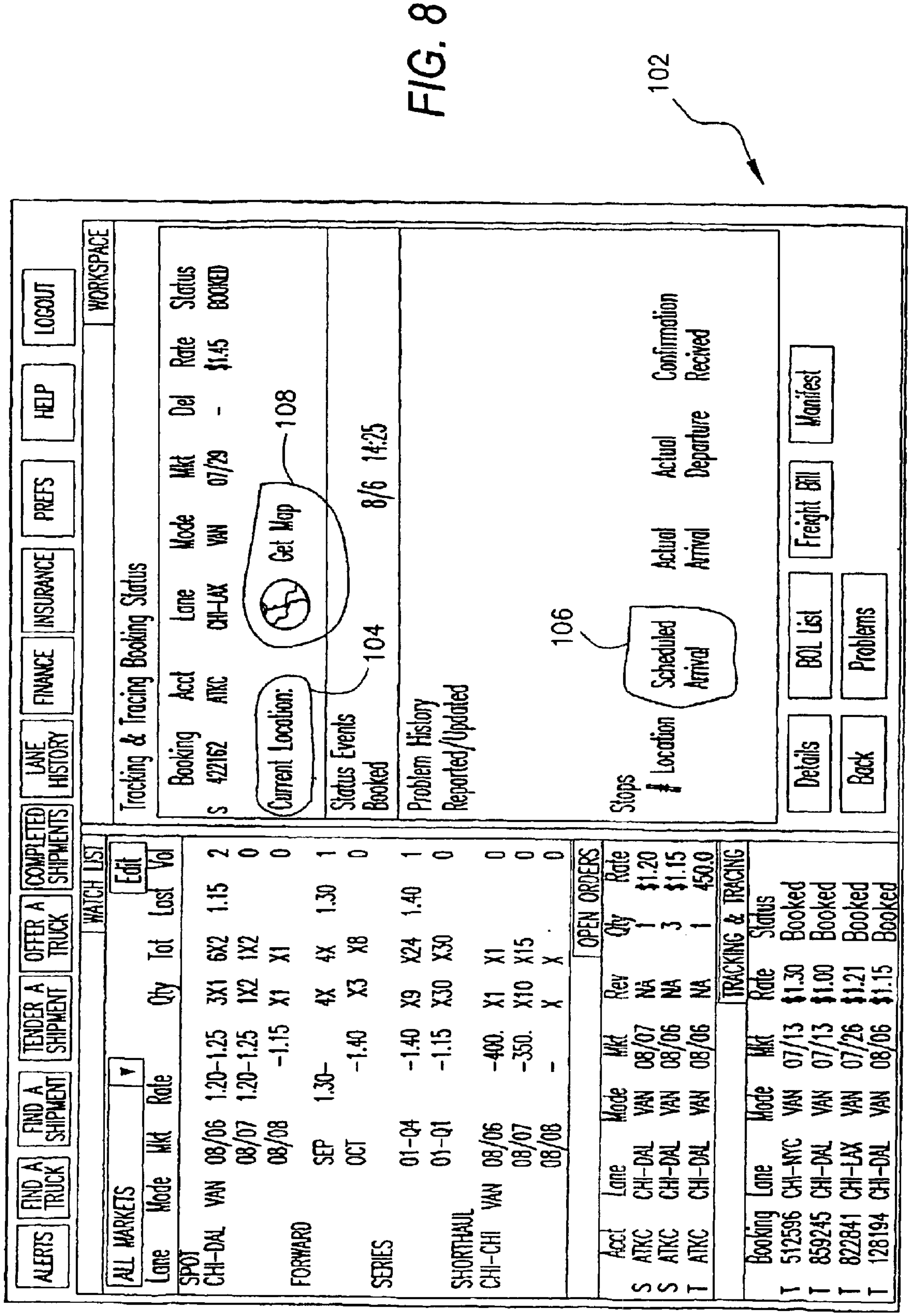
FIG. 8 shows the user interface for checking the status of a shipment.

For example, the status of booking 422162 can be obtained by clicking the "Status" button 100 in the lower part of the present WORKSPACE panel. Doing so brings up a status screen 102 as shown in FIG. 8, in which a customer 21 can choose from a variety of information about a booking, including Current Location 104 and Scheduled Arrival 106, as previously discussed. A link 108 to a mapping utility provides a convenient visual cue for locating a shipment.

Figure 9:
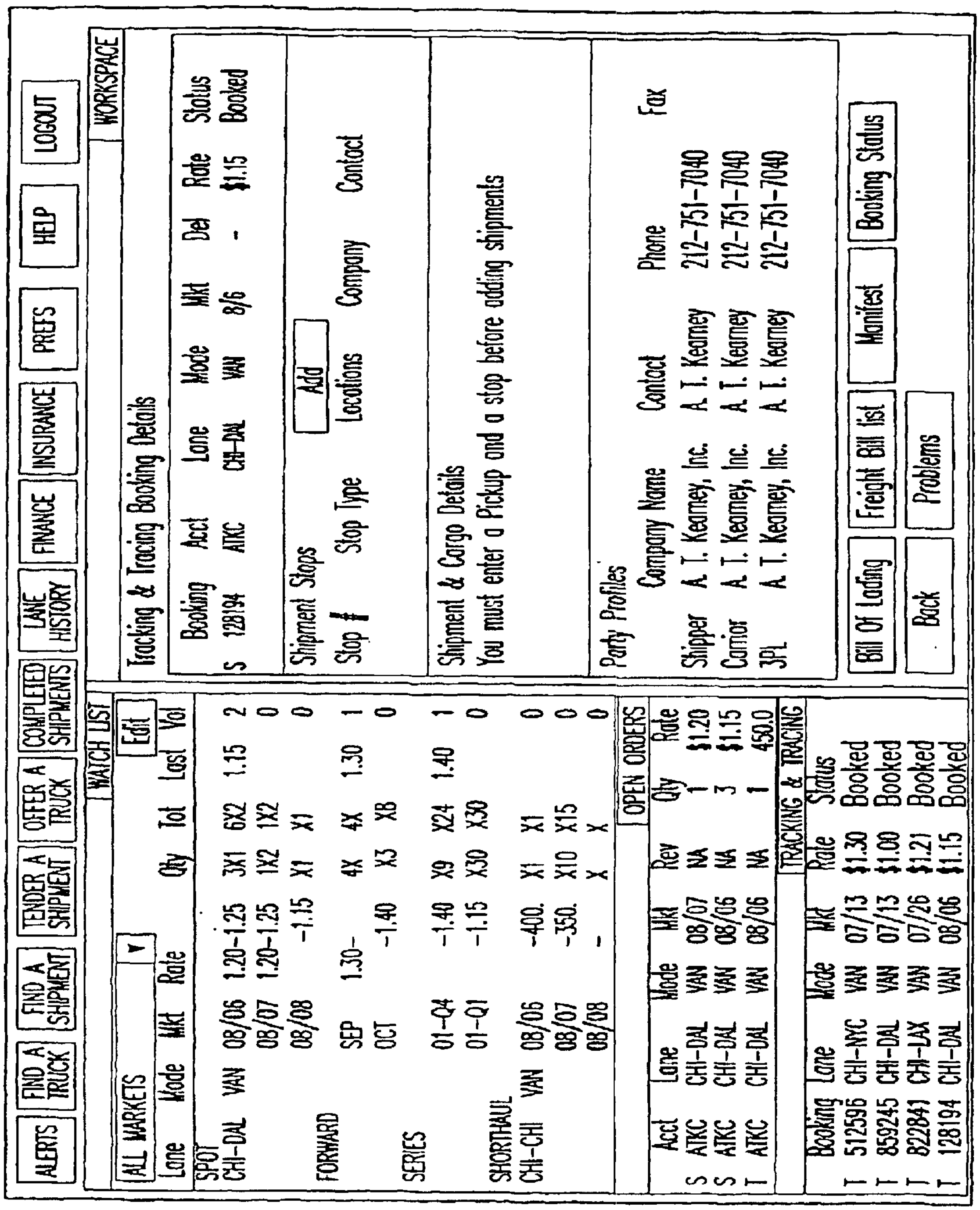
FIG. 9 shows the user interface for viewing the details of a shipment.

Similarly, other details of booking 422162 can be obtained by clicking the "Booking Details" button 101 in the lower part of the WORKSPACE panel shown in FIG. 6. Doing so brings up a details screen 120 as shown in FIG. 9, in which a customer 21 can choose from other details regarding a shipment.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed is:

1. A tracking apparatus, comprising:

a mobile device varying in geographic location;

a callback unit, attached to said mobile device, programmed to telephone a destination and terminate said telephone call prior to completion of said call;

a computer system responsive to said unanswered calls from said callback unit, said computer system having call-information processing software, a database, and a user interface resident therein.

2. The tracking apparatus of claim 1, further comprising said unanswered-call information being proprietary to a specific telephone provider.

3. The tracking apparatus of claim 1, further comprising said unanswered-call information being customized to a stand-alone phone company integrated with said computer system.

4. The tracking apparatus of claim 1, further comprising said callback unit is pre-programmed to originate calls according to a user's preferred schedule.

5. The tracking apparatus of claim 1, further comprising said calls are received by a landline telephone system connected to said computer system.

6. The tracking apparatus of claim 1, further comprising said calls are received by a mobile telephone system which transfers them to a landline telephone system connected to said computer system.

7. The tracking apparatus of claim 1, further comprising said database is coordinated with a telephone provider to frequently update area codes with geographic regions.

8. The tracking apparatus of claim 1, further comprising said computer system, application, database, and an operating system restrict separate users from viewing data belonging to other users through separate processes each of which has a data segregation component.

9. The tracking apparatus of claim 1, further comprising said computer system being operable by a human or automated attendant vocally communicating with users through telephone.

10. The tracking apparatus of claim 1, further comprising said computer system having multiple telephone lines connected thereto.

11. The tracking apparatus of claim 1, wherein said callback unit further comprises an receiver for receiving telephone calls and in response originating a call to said computer system.

12. The tracking apparatus of claim 4, wherein said callback unit adjusts the frequency of outgoing calls depending on its distance or expected travel time from a predetermined destination.

13. A method for tracking, comprising:

calling a central base station from a callback unit attached to a mobile device;

programming the duration of the telephone call to be sufficient to convey call-origin properties yet brief enough to hang up before incurring calling charges;

reading call-origin information accompanying said call;

processing desired portions of said call-origin information by a computer system connected to said central base station; and coordinating said call-origin information with a database within said computer system.

14. The tracking method of claim 13, further comprising said call-origin information being proprietary to a specific telephone provider.

15. The tracking method of claim 13, further comprising customizing said call-origin information, by an individual telephone company;

connecting said individual telephone company to said computer system.

16. The tracking method of claim 13, further comprising coordinating said database with a telephone provider to frequently update area codes with geographic regions.

17. The tracking method of claim 13, further comprising segregating data areas belonging to said separate processes; thereby restricting separate users from viewing data belonging to other users.

18. The tracking method of claim 13, further comprising enabling users to remotely access said computer system.

19. The tracking method of claim 13, further comprising operating said computer system by a human or automatic attendant;

vocally communicating with users through a telephone; thereby providing desired portions of said call-origin information to users lacking remote access to said computer system.

* * * * *